Feb. 27, 1940.    A. L. ROSENMUND    2,191,684
MACHINE FOR USE IN MAKING BOXES
Filed Oct. 13, 1938    4 Sheets-Sheet 1

INVENTOR.
Alfred L. Rosenmund.
BY Edward F. Dunne
ATTORNEYS.

Feb. 27, 1940.  A. L. ROSENMUND  2,191,684
MACHINE FOR USE IN MAKING BOXES
Filed Oct. 13, 1938  4 Sheets-Sheet 3

INVENTOR.
Alfred L. Rosenmund.
BY Edward F. Dunne
ATTORNEYS.

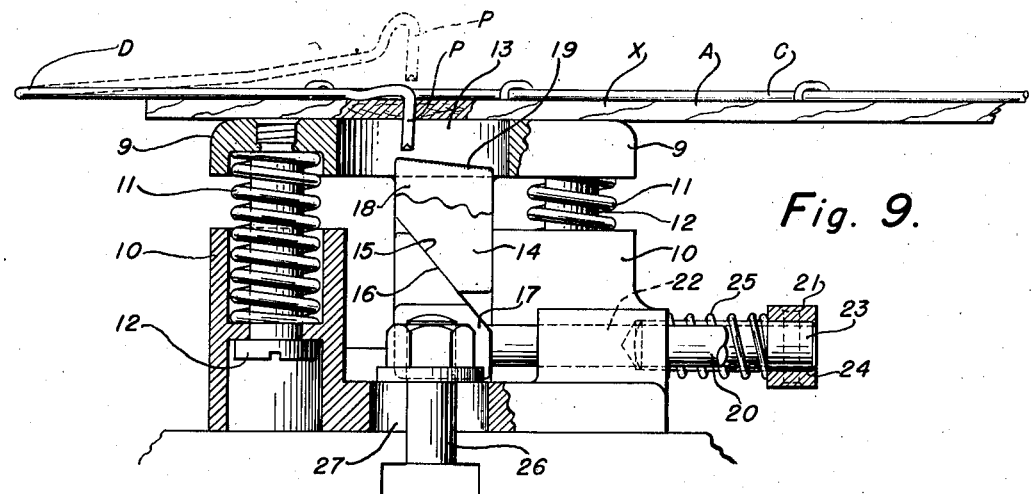
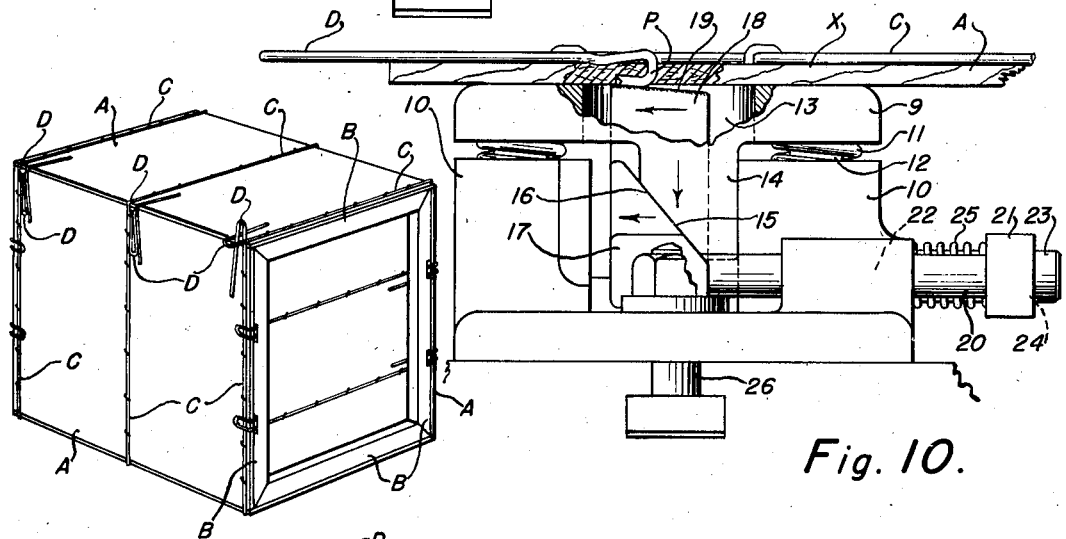
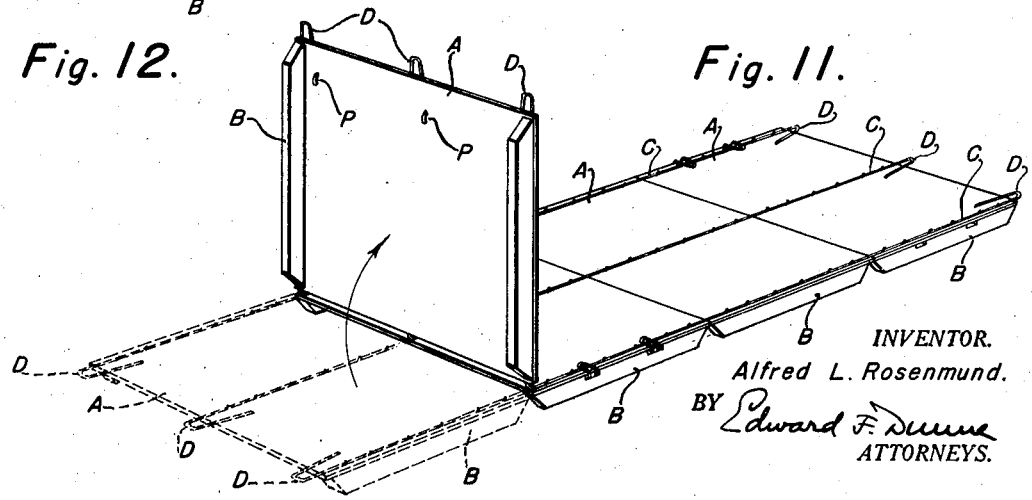

Patented Feb. 27, 1940

2,191,684

UNITED STATES PATENT OFFICE 2,191,684

MACHINE FOR USE IN MAKING BOXES

Alfred L. Rosenmund, Rockaway, N. J., assignor to Stapling Machines Co., a corporation of Delaware Application October 13, 1938, Serial No. 234,793

10 Claims. (Cl. 140—93)

This invention relates to machines for equipping wired box parts with interengageable fasteners and particularly to improved means for forming and clinching the prong of such a fastener.

It is an object of the invention to provide certain improvements in machines of the type shown and described in United States Patents No. 1,933,031, of October 31, 1933, and No. 2,024,188, of December 17, 1935.

It is a further object to provide improved prong-forming and prong-clinching instrumentalities for machines of the type referred to, which are adapted to facilitate the driving of the prong and to produce a better clinch.

It is a further object to provide a mechanism that will positively clinch the prong after it is driven through a box part.

It is a further object to provide prong-clinching instrumentalities which are adapted to embed the clinched portion of the prong in the box part.

Other objects will be in part obvious and in part pointed out hereinafter.

Figure 4:
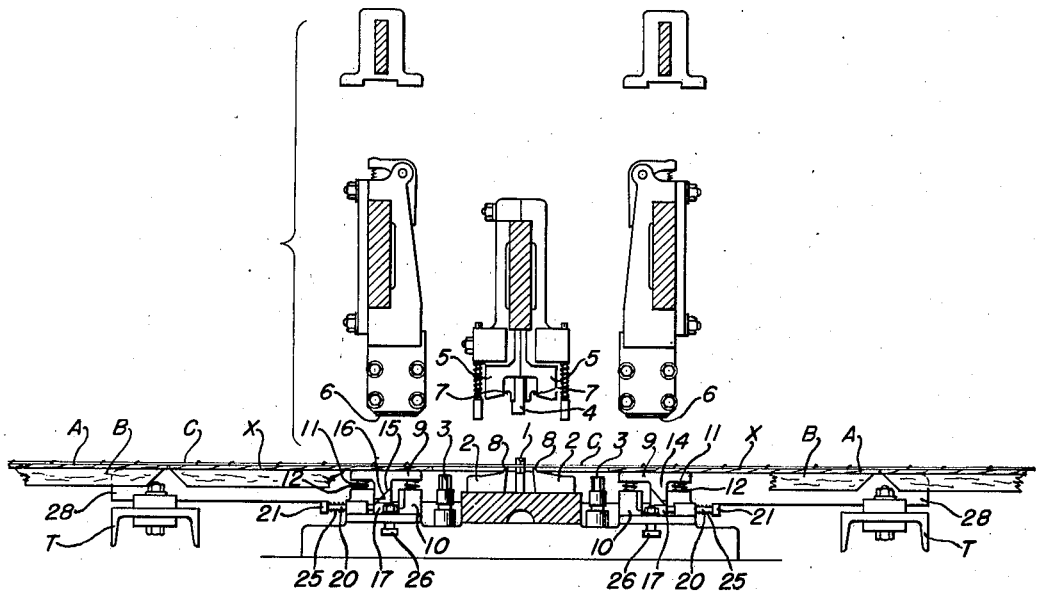

Fig. 4 is a diagrammatic view of the wire-manipulating elements of the machine which sever the wire between box parts, form prongs on the severed ends, bend the wires to form bights or loops, drive the prongs into the box parts to perpetuate the bights or loops, and clinch the prongs which are driven through the box parts. In this view two wire-connected box parts are shown in position to be operated upon.

Figure 5:
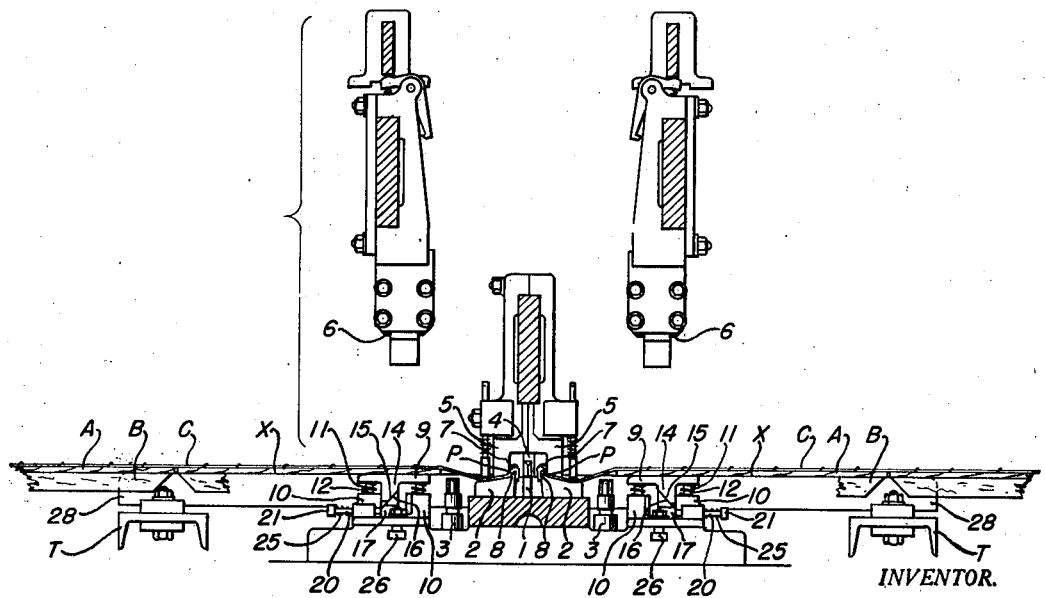

Fig. 5 is a similar view showing the position of the wire-manipulating elements after the wire connecting the two box parts has been severed and prongs formed on the ends of the severed wires.

Figure 6:
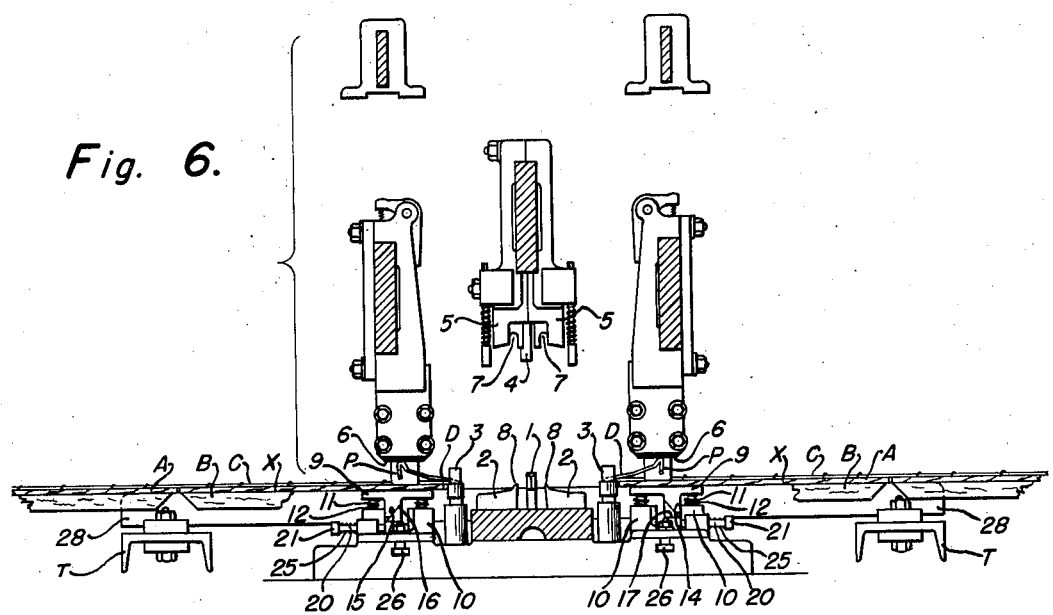

Fig. 6 is a similar view showing the position of the wire-manipulating elements after the prongs have been swung over onto their respective box parts to form the bights or loops.

Figure 7:
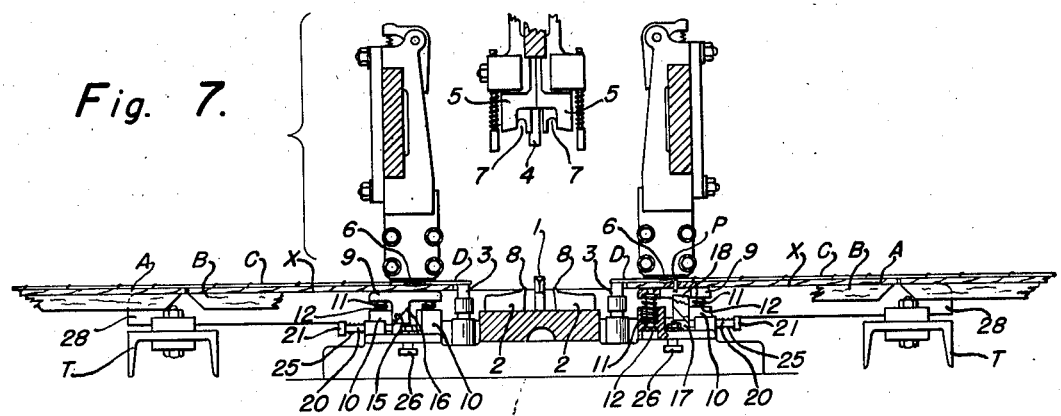

Fig. 7 is a similar view showing the position of the parts after the prongs have been driven through the box parts and before the clinching operation.

Figure 8:
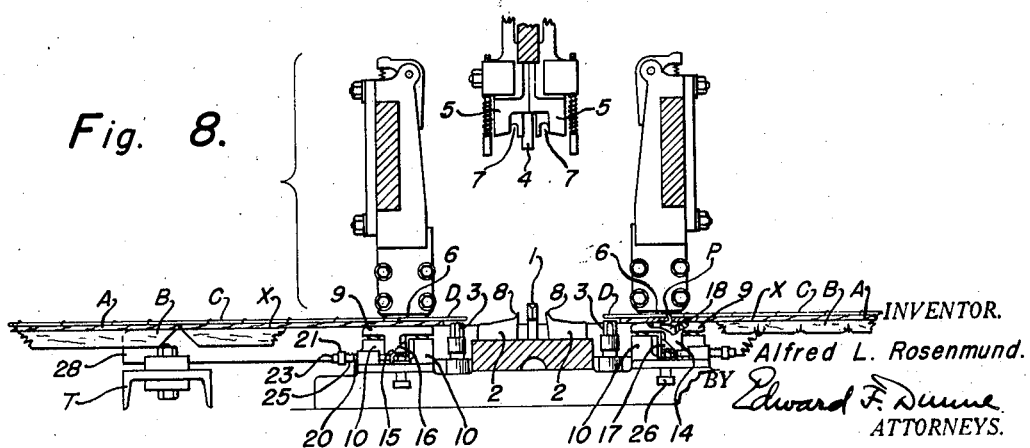

Fig. 8 is a similar view showing the position of the parts after the prongs have been clinched.

Fig. 9 is an enlarged side elevation, partially sectioned, of one clinching unit, with the parts in the position shown in Fig. 7. In this view the prong, as shown in full lines, has been driven through the box part. The prong prior to the driving operation is shown in dotted lines.

Fig. 10 is a similar view showing the position of the parts at the completion of a clinching operation.

Fig. 11 is a perspective view of a wirebound box blank equipped with interengageable fasteners or bights of the type supplied by the machine of this invention. In this view one section of the box blank is in a raised position to show the under surface of the box part with the prong embedded therein.

Fig. 12 is a perspective view of a completed box equipped with interengageable fasteners by the machine of this application, showing one of the fasteners in an intermediate stage of interengagement and the other fasteners completely interengaged.

There is illustrated in Figs. 11 and 12 one product of the machine of this application.

Referring to Fig. 11, there is shown a wirebound box blank consisting of four separate sections of side material A and cleats B connected together in foldable relationship by binding wires C which are stapled to the side material A and the cleats B. The wires C are stapled to the side material A and the cleats B in a wirebound box blank machine. Such a machine is shown in United States Patent No. 2,101,457, of December 7, 1937. As the box blanks emerge from the box blank machine they are connected by the binding wires C, appropriate spaces being left between successive box blanks to permit severing the wires and manipulating the severed ends to provide bights D, which bights may be interengaged to close the box, as shown in Fig. 12.

Figure 1:
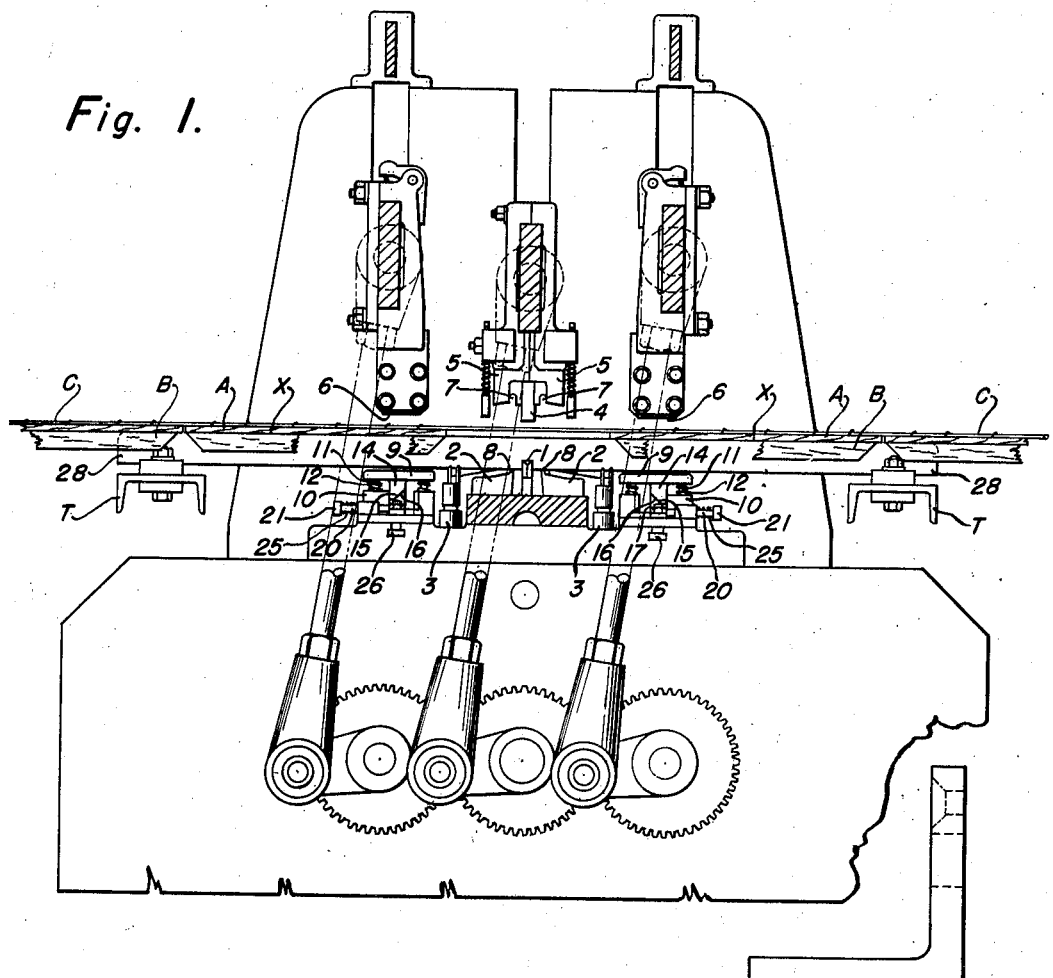
Figure 1 is a partial side elevation, partly in section, of a machine embodying the invention.

After the wire-connected box blanks leave the box blank machine, they are fed into the machine of this application and positioned upon a vertically movable table T, as illustrated in Fig. 1. When so positioned, the space between the wire-connected box blanks is located directly above cutters 1, prong-forming blocks 2, and bight-forming spindles 3, and below cutter actuator 4 carrying prong-forming elements 5, and each box blank is located beneath a driver 6. Preferably, the machine of this application is operated through a one-cycle clutch, and, as explained in Patents No. 1,933,031 and No. 2,024,188, during one cycle of operation the several wire-manipulating elements go through the successive operations shown diagrammatically in Figs. 4 to 8.

Referring to Fig. 4, there is shown the first operation of the machine, in which the table T with supports 28 upon which the box parts X rest, is lowered, presenting the wire C to the cutters 1. As shown in Fig. 5, the cutter actuator 4 descends, operating the cutters 1 to sever the wire C. The prong-forming elements 5 then bend the ends of the severed wire C over the prong-forming blocks 2 to form prongs P. The bight-forming spindles 3 are then raised to lift the wire C with the prongs P from the prong-forming blocks 2. The bight-forming spindles 3 are then partially rotated to swing the prongs P over onto their respective box parts X, as illustrated in Fig. 6. Referring to Fig. 7, the drivers 6 descend, driving the prongs P through the box parts X. The construction and operation of the wire-manipulating mechanisms hereinbefore referred to are shown and described in said Patents No. 1,933,031 and No. 2,024,188 and need not be described in detail herein.

Continued descent of the drivers 6 will cause the clinching mechanism of this application to clinch the prongs P on the under surface of side material A in a manner presently to be described.

Figure 2:
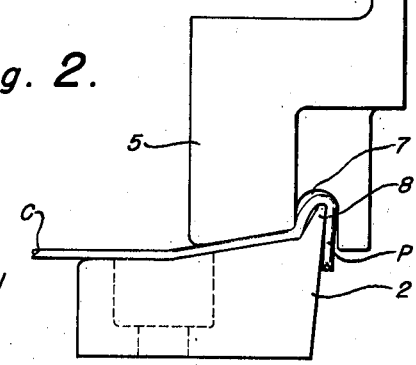
Fig. 2 is an enlarged side elevation of the prong-forming dies, showing a portion of wire with the prong formed thereon.

Referring to Fig. 2, there is shown an enlarged view of a prong-forming element 5 completing a prong P by bending an end of the severed wire C about the prong-forming block 2. To attain this desired shape of prong P there is provided a bevel-shaped projection 8 on the upper surface of prong-forming block 2, over which the wire is shaped by a recess 7 located in the under surface of prong-forming element 5. As the wire C is bent about the bevel-shaped projection 8 it is permitted to flare or bulge upwardly into the recess 7, resulting in a prong with a shape quite similar to the shape of a staple. This form of prong P is very desirable since it provides more rigidity and more contact surface for driving. Heretofore there has been considerable difficulty in driving the prong P through hard wood without buckling or breaking, due mostly to the sharp angle at which it was formed. This improved shape of prong P helps to eliminate this difficulty and to insure a complete and satisfactory clinch.

Figure 3:
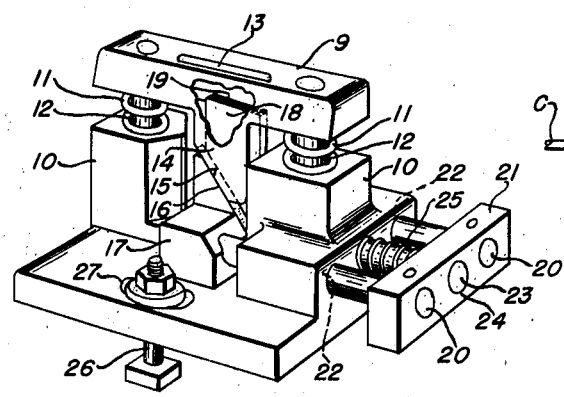
Fig. 3 is an enlarged perspective view of one of the clinching units partially sectioned.

Fig. 3 shows one clinching unit embodying the invention. While only one unit is shown and described in detail, it will be understood that a clincher unit is provided for each wire with a prong P formed thereon. The clincher unit is provided with a plate 9 supported above and in spaced relationship to clincher body 10 by springs 11 and bolts 12 slidable in recesses formed in clincher body 10. Plate 9 is provided with an opening 13 passing therethrough and into which the prong P may be driven. Projecting downwardly from the plate 9 is a fork-shaped lug 14 having at the lower extremity of each leg of the fork a downwardly-extending bevel surface 15 adjacent to and coinciding with a bevel surface 16 on a horizontally movable block 17. Fixed to and extending upwardly from block 17 is a clincher block 18 having a knurled clinching surface 19. Clincher 18 is slidably located between the legs of fork-shaped lug 14 and extends into the lower part of opening 13 of plate 9. The top knurled surface 19 of clincher block 18 lies a sufficient distance below the top of plate 9 to permit the prong to be driven through the box part a considerable distance before contacting the clinching surface 19. To guide movable block 17 and clincher 18 in their horizontal movement, there is provided a pair of rods 20 relatively spaced in clincher body 10. One end of each rod 20 is secured in movable block 17. The other end of each rod 20 is secured in a crossbar 21 and can reciprocate horizontally in bearings 22 in clincher body 10. A stud 23 located midway between rods 20 having one end permanently secured in clincher body 10 and the other end loosely mounted in bearing 24 of crossbar 21, carries a spring 25 interposed between the clincher body 10 and the inner surface of crossbar 21 to return the movable block 17 and clincher block 18 to their initial position. The clinching units are adjustably secured to a machine casting by a bolt 26 and an elongated slot 27.

The operation of the clincher mechanism is best shown in Figs. 9 and 10. In Fig. 9 there is shown a box part X positioned on plate 9 for a clinching operation. As illustrated in broken lines, the prong P is swung over onto the side material A, forming the bight D with the prong P positioned to be driven through the box part and clinched. When the driver descends in the manner described in said Patent No. 2,024,188, the prong P is driven through the side material A and into the opening 13 of plate 9, the point of prong P preferably being slightly above the knurled surface 19 of clincher block 18 when the prong P is completely driven. During this driving operation the plate 9 is yieldingly supported above clincher block 18 by springs 11 which are of sufficient stiffness to resist the thrust of the driver 6 while it is driving the prong through the box part but will yield to further descent of the driver 6 when the driver contacts the box part. Continued descent of driver 6 after contacting the box part, forces plate 9 downwardly against the action of springs 11 and forces the end of the prong P into contact with surface 19 of clincher block 18. As the point of prong P contacts the knurled surface 19 of clincher 18 the beveled surface 15 of lug 14 is forced down against the beveled surface 16 of movable block 17, causing the block 17 and clincher block 18 to move in the direction indicated by arrows, i. e., to the left in Fig. 10. This horizontal movement of the clincher block 18 plus the continuing downward movement of the prong bends the prong and embeds it in the under surface of the box part, as shown in Fig. 10.

It will be noted that the prong is completely or almost completely driven through the box part before contacting the clincher block and before being bent to clinch the prong in the under surface of the box part. It will be noted also that during a clinching operation the clincher block moves with the prong in the direction of the clinch.

Such an operation tends to reduce buckling of the prong during a driving operation and to insure a uniform and dependable clinch.

The expression "staple-like prong" as used in the claims is intended to cover a prong having substantially the relationship to the body of the wire shown in Fig. 2.

It will be understood that the invention is not to be limited to the specific embodiment shown for purposes of illustration and that all of the inventive features need not be used conjointly.

I claim:

1. In a machine having instrumentalities for forming a bight on a wire secured to a box part and driving the end of the wire through the box part to perpetuate the bight, mechanism for clinching the end of the wire which is driven through the box part comprising a yielding support for the box part having an opening through which the wire end may be driven, a clincher block located beneath the opening in the support and mounted to move at substantially a right angle to the movement of the support, and means to move the clincher block during movement of the support.

2. In a machine having instrumentalities for forming a bight on a wire secured to a box part and driving the end of the wire through the box part to perpetuate the bight, mechanism for clinching the end of the wire which is driven through the box part comprising a yielding support for the box part having an opening through which the wire end may be driven, a clincher block located beneath the opening in the support and mounted to move at substantially a right angle to the movement of the support, and means to move the clincher block in accordance with movement of the support.

3. In a machine having instrumentalities for forming a bight on a wire secured to a box part and driving the end of the wire through the box part to perpetuate the bight, mechanism for clinching the end of the wire which is driven through the box part comprising a yielding support for the box part having an opening through which the wire end may be driven, a clincher block located beneath the opening in the support and mounted to move at substantially a right angle to the movement of the support, and means actuated by movement of the support to move the clincher block.

4. In a machine having instrumentalities for forming a bight on a wire secured to a box part and driving the end of the wire through the box part to perpetuate the bight, mechanism for clinching the end of the wire which is driven through the box part comprising a yielding support for the box part, a clincher block located beneath the support and mounted to move at substantially a right angle to the movement of the support, and means to move the clincher block during movement of the support.

5. In a machine having instrumentalities for forming a bight on a wire secured to a box part and driving the end of the wire through the box part to perpetuate the bight, mechanism for clinching the end of the wire which is driven through the box part comprising a vertically movable support for the box part, a horizontally movable clincher block located beneath the support, and means to move the clincher block horizontally during vertical movement of the support.

6. Clinching mechanism according to claim 1, in which the yielding support for the box part is of such character as to resist movement of the support during the driving of the wire end through the box part and then yield to an increased pressure.

7. Mechanism for clinching the end of a flexible binder driven through a box part comprising a yielding support for a box part movable in one direction, a clincher block movable at substantially a right angle to the direction of movement of the support, and means automatically to move the clincher block during movement of the support.

8. Mechanism for clinching the end of a flexible binder driven through a box part comprising a yielding support for a box part movable in one direction, a clincher block movable at substantially a right angle to the direction of movement of the support, and means actuated by the support to move the clincher.

9. Mechanism for clinching the end of a flexible binder driven through a box part comprising a vertically movable support for a box part, a horizontally movable clincher block located beneath the support, and means to move the clincher block horizontally during vertical movement of the support.

10. Clinching mechanism according to claim 9, in which means are provided to resist movement of the support during the driving of the wire end therethrough and to permit movement of the support upon the application of increased pressure.

ALFRED L. ROSENMUND.